United States Patent
Bae et al.

(10) Patent No.: US 10,686,208 B2
(45) Date of Patent: Jun. 16, 2020

(54) APPARATUS AND METHOD FOR MANUFACTURING BATTERY CELL

(71) Applicant: LG Chem, Ltd., Seoul (KR)

(72) Inventors: Sung Hoon Bae, Gyeonggi-do (KR); Seok Je Kim, Chungcheongbuk-do (KR); Dae Sik Chung, Daejeon (KR); Su Han Park, Daejeon (KR)

(73) Assignee: LG CHEM, LTD., Seoul (KR)

(*) Notice: Subject to any disclaimer, the term of this patent is extended or adjusted under 35 U.S.C. 154(b) by 47 days.

(21) Appl. No.: 15/887,545

(22) Filed: Feb. 2, 2018

(65) Prior Publication Data
US 2018/0226673 A1    Aug. 9, 2018

(30) Foreign Application Priority Data
Feb. 6, 2017 (KR) .................. 10-2017-0016185

(51) Int. Cl.
| | |
|---|---|
| *H01M 10/04* | (2006.01) |
| *H01M 2/36* | (2006.01) |
| *H01M 10/052* | (2010.01) |
| *H01M 10/06* | (2006.01) |
| *H01M 10/058* | (2010.01) |
| *H01M 10/0568* | (2010.01) |

(52) U.S. Cl.
CPC ....... *H01M 10/0404* (2013.01); *H01M 2/361* (2013.01); *H01M 2/365* (2013.01); *H01M 10/049* (2013.01); *H01M 10/052* (2013.01); *H01M 10/058* (2013.01); *H01M 10/0568* (2013.01); *H01M 2300/0025* (2013.01)

(58) Field of Classification Search
CPC ................................................. H01M 10/0404
See application file for complete search history.

(56) References Cited

U.S. PATENT DOCUMENTS

| | | | |
|---|---|---|---|
| 8,974,955 B2 | 3/2015 | Min et al. | |
| 2009/0253038 A1* | 10/2009 | Segawa ............... | H01M 10/044 429/210 |
| 2011/0104527 A1* | 5/2011 | Choi .................... | H01M 2/024 429/53 |
| 2013/0196202 A1* | 8/2013 | Kaiser ............... | H01M 10/0404 429/94 |
| 2013/0244093 A1* | 9/2013 | Min .................... | H01M 2/0287 429/185 |

(Continued)

FOREIGN PATENT DOCUMENTS

| | | |
|---|---|---|
| JP | 2000021450 A * | 1/2000 |
| KR | 10-2012-0009661 A | 2/2012 |

(Continued)

OTHER PUBLICATIONS

Definitions (Year: 2019).*
JP2000021450Atranslation (Year: 2019).*
TransalationKR102004295 (Year: 2020).*

*Primary Examiner* — Brian R Ohara
(74) *Attorney, Agent, or Firm* — Birch, Stewart, Kolasch & Birch, LLP

(57) ABSTRACT

The present disclosure relates to an apparatus and a method for manufacturing a battery cell, and more particularly, to an apparatus and a method for manufacturing a battery cell, wherein a pressing jig provided with a semi-elliptical pressing part presses the battery cell to remove air bubbles from the battery cell.

3 Claims, 4 Drawing Sheets

(56) References Cited

U.S. PATENT DOCUMENTS

2015/0013720 A1\* 1/2015 Yasooka ........... H01M 10/0404
134/6

FOREIGN PATENT DOCUMENTS

| KR | 10-2012-0060707 A | 6/2012 |
| KR | 10-1453126 B1 | 10/2014 |
| KR | 10-2015-0043754 A | 4/2015 |
| KR | 10-2015-0089555 A | 8/2015 |

\* cited by examiner (a)　　　　　(b)　　　　　(c)

APPARATUS AND METHOD FOR MANUFACTURING BATTERY CELL

CROSS-REFERENCE TO RELATED APPLICATION

This application claims priority to Korean Patent Application No. 10-2017-0016185 filed on Feb. 6, 2017 the disclosure of which is incorporated herein by reference in its entirety.

TECHNICAL FIELD

The present disclosure relates to an apparatus and a method for manufacturing a battery cell, and more particularly, to an apparatus and a method for manufacturing a battery cell which removes the air bubbles formed in the battery cell by pressing with a pressing jig having a semi-elliptical pressing part.

RELATED ART

The pouch-type lithium secondary battery (hereinafter referred to as a battery cell), as a unit cell constituting a battery, has flexibility, a relatively free shape, a light weight, and excellent safety, and thus has increasing demand as a power source for mobile electronic devices, such as smart phones, camcorders, and laptop computers.

The battery cell has a structure in which a plurality of positive electrodes (e.g., aluminum foils) and a plurality of negative electrodes (e.g., copper foils) are laminated with separators therebetween, and a positive electrode tab and a negative electrode tab are respectively welded to the positive electrodes and the negative electrodes and are then enclosed and sealed with an aluminum pouch.

Manufacturing processes of such battery cells are roughly divided into three processes including an electrode process, an assembly process, and a formation process, which are sequentially performed.

More specifically, among the three processes, in the electrode process of manufacturing the positive electrodes and the negative electrodes, each of the materials is mixed at an appropriate ratio, and the positive electrodes are coated with aluminum and the negative electrodes are coated with copper foils.

Then, a slitting step is performed, in which the electrodes are pressed and flattened into a certain thickness through a roll press and then slit according to the electrode sizes.

In addition, the assembly process among the three processes includes a notching step in which unnecessary portions are removed from the electrodes, a stack and folding step in which the positive electrode materials, the separators, and the negative electrode materials are alternately laminated and then folded multiple times according to the battery capacity, or a winding step in which the electrodes and the separators are overlapped and rolled.

Then, a step is performed in which the positive electrode materials, the separators, and the negative electrode materials, which are folded or rolled, are packaged with an aluminum packaging material, and are sealed in a vacuum state after an electrolyte is added thereinto.

Finally, the formation process among the three processes is a process in which the battery cell is activated while the charge/discharge of the assembled battery cell is repeated, and a degassing step in which the gas generated in the battery cell during the activation is discharged is performed.

Meanwhile, in the manufacturing process of the battery cell, air bubbles are formed on the inner surface of the battery cell due to various factors, and unless the air bubbles are removed from the surface of the battery cell, they may cause problems that the performance of the battery cell is degraded, and moreover, the service life of the battery cell is reduced.

Therefore, the air bubbles on the surface of the battery cell should be removed, and it has been done by providing a separate electrolyte filling device so that the air bubbles frequently generated in the electrolyte filling step and degassing step during the battery cell manufacturing process are discharged to the outside when the electrolyte is filled in the battery cell, or by using a general pressing device used in degassing.

However, the above-mentioned electrolyte filling device has a structure in which a separate air bubble path is provided aside from the electrolyte filling path, and when a large amount of electrolyte is filled to speedily manufacture the battery cell, the generated air bubbles may not be discharged through the air bubble path.

In addition, when a small amount of electrolyte is filled to prevent the occurrence of air bubbles, there is a problem that the lead time for manufacturing a battery cell is increased.

Meanwhile, there is another problem that pressing force is not uniformly distributed during pressing because a general pressing device has a flat-plate shape, so that there may be remaining air bubbles when a large amount of air bubbles are present.

Thus, the development of a technique for more efficiently and quickly removing the air bubbles formed on the inner surface of the battery cell is demanded.

KR1453126B is an example of related art.

SUMMARY

The present disclosure provides an apparatus and a method for manufacturing a battery cell which removes the air bubbles formed on the inner surface of the battery cell.

In accordance with an exemplary embodiment, an apparatus for manufacturing a battery cell by which air bubbles of the battery cell are removed includes a pair of pressing jigs each having a semi-elliptical pressing part formed on a contact surface contacting the battery cell and configured to apply a pressure to upper and lower portions of the battery cell, and a support part configured to fix the battery cell between the pair of pressing jigs, wherein a predetermined pressure is applied to the pair of pressing jigs to discharge the air bubbles of the battery cell.

The pressing jigs may have larger sizes than the size of the battery cell.

The pair of pressing jigs may discharge the air bubbles by further applying a predetermined amount of heat when pressing the battery cell.

The pressing parts of the pair of pressing jigs may be formed of a flexible material.

In accordance with another exemplary embodiment, a method for manufacturing a battery cell by removing air bubbles of the battery cell includes filling an electrolyte into the battery cell having an electrolyte filling path formed on one side or both sides thereof, pressing with a pair of pressing jigs so that the air bubbles formed by the electrolyte filling are discharged to the outside through the electrolyte filling path, and removing the electrolyte filling path and sealing the battery cell after pressing with the pair of pressing jigs is performed.

Pressing with the pair of pressing jigs may be performed for a predetermined time.

Pressing with the pair of pressing jigs may further apply a predetermined amount of heat when pressing the battery cell.

In accordance with yet another exemplary embodiment, a method for manufacturing a battery cell by removing air bubbles of the battery cell includes discharging a gas generated through a formation process from inside the battery cell having an gas discharge path formed on one side or both sides thereof, pressing with a pair of pressing jigs so that the air bubbles remaining on the inner surface of the battery cell is discharged to the outside of the battery cell, and removing the gas discharge path and sealing the battery cell after pressing with the pair of pressing jigs is performed.

Pressing with the pair of pressing jigs may be performed for a predetermined time.

Pressing with the pair of pressing jigs may further apply a predetermined amount of heat when pressing the battery cell.

BRIEF DESCRIPTION OF THE DRAWINGS

Exemplary embodiments may be understood in more detail from the following description taken in conjunction with the accompanying drawings, in which.

DETAILED DESCRIPTION

Hereinafter with reference to the features disclosed in the accompanying drawings, exemplary embodiments will be described in detail. However, the present disclosure is not restricted or limited by the exemplary embodiments. Rather, these embodiments are provided so that this disclosure will be thorough and complete, and will fully convey the scope of the inventive concept to those skilled in the art.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless referred to the contrary.

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present disclosure. Accordingly, the terms used in the present disclosure should be defined on the basis of the meanings the terms have and the contents of the entirety of the present disclosure rather than defined by simple names of the terms.

Embodiment 1

Next, an apparatus for manufacturing a battery cell in accordance with an exemplary embodiment will be described.

An apparatus for manufacturing a battery cell in accordance with an exemplary embodiment has a semi-elliptical pressing part under a general pressing jig such that air bubbles of the battery cell may efficiently and quickly be removed.

Figure 1:
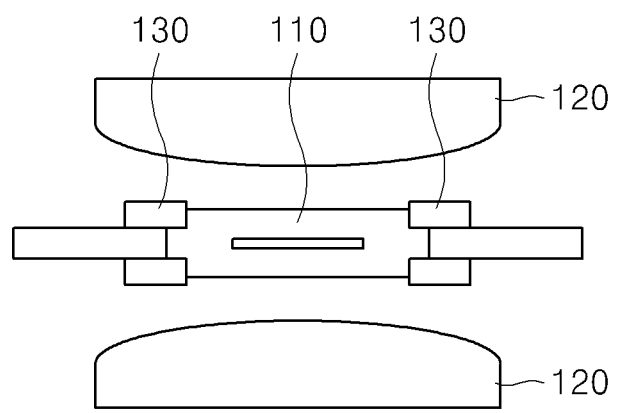
FIG. 1 is a structural view of an apparatus for manufacturing a battery cell in accordance with an exemplary embodiment.

FIG. 1 is a structural view of an apparatus for manufacturing a battery cell in accordance with an exemplary embodiment.

Referring to FIG. 1, an apparatus for manufacturing a battery cell in accordance with an exemplary embodiment is configured to include a pair of pressing jigs 120 each having a semi-elliptical pressing part on a contact surface contacting a battery cell 110 to apply a pressure on the upper and lower portions of the battery cell and a support part 130 which fixes the battery cell 110 between the pair of pressing jigs 120.

The pair of pressing jigs 120 are devices which press the battery cell 110 with a predetermined pressure so that the air bubbles of the battery cell are discharged.

Each of the components of the apparatus for manufacturing the battery cell will be described below in more detail.

First, since the battery cell 100 generally uses a lithium-based secondary battery, the structure of the battery cell is configured in a shape in which a plurality of positive electrodes (e.g., aluminum foils) and a plurality of negative electrodes (e.g., copper foils) are laminated with separators disposed therebetween, and a positive electrode tab and a negative electrode tab are respectively welded to the positive electrodes and the negative electrodes and are then enclosed and sealed with an aluminum pouch.

In the battery cell 110 with such a structure, air bubbles are formed on an inner surface of the battery cell due to various factors, and it can be considered that the air bubbles are generally formed between the electrodes and the separators.

In addition, the air bubbles are mainly formed in an assembly process and a formation process among the manufacturing processes of the battery cell.

In addition, each of the pair of pressing jigs 120 may have a semi-elliptical pressing part on the contact surface contacting the battery cell 110 and be configured as one pair so as to apply pressures to the upper and lower portions of the battery cell 110.

In addition, since air bubbles are generally formed more easily on a central portion than on edge portions of the battery cell, the pressing parts of the pair of pressing jigs 120 are formed in semi-elliptical shapes so as to apply a stronger pressure to the central portion than to the peripheral portions.

In addition, since the pair of pressing jigs 120 use a lower pressure than a typically used pressure due to the semi-elliptical shape, the amount of electrolyte discharged during pressing for removing the air bubbles may be reduced.

Also, the pair of pressing jigs 120 are provided in sizes larger than the size of the battery cell, such that the entire surface of the battery cell may receive pressure by a single press.

In addition, the pressing part of the pair of pressing jigs 120 may be formed of a pliable, elastic silicon-based rubber material such as polydimethylsiloxane (PDMS), and also be formed of a heat conductive material, such as a mixture of a flexible, elastic conductive filler and rubber, in order to transfer heat more effectively.

As such, when the pair of pressing jigs 120 are formed of a flexible, resilient material, the pressure of the pressing jigs 120 during pressing may be sequentially and globally applied from the central portion to the edge portions of the battery cell 110.

Also, the pair of pressing jigs 120 may additionally generate heat and apply not only a pressure but also heat when the battery cell is pressed, and thus allow the air bubbles formed on the inner surface of the battery cell to be effectively removed.

Also, the pair of pressing jigs 120 may apply a pressure by the operations of upper and lower hydraulic cylinders, but exemplary embodiments are not limited thereto.

In addition, the support part 130 is a device which fixes the battery cell between the pair of pressing jigs 120, and grips and fixes wide side surface portions of the battery cell, but exemplary embodiments are not limited thereto.

Accordingly, the support part 130 allows the entire surface of the battery cell to be pressed while preventing the battery cell from deviating when the battery cell is pressed.

Embodiment 2

Next, a method for manufacturing a battery cell in accordance with an exemplary embodiment will be described.

A method for manufacturing a battery cell in accordance with an exemplary embodiment is a battery cell manufacturing method including a step of removing air bubbles that are formed in the battery cell when an electrolyte is filled in the battery cell.

Figure 2:
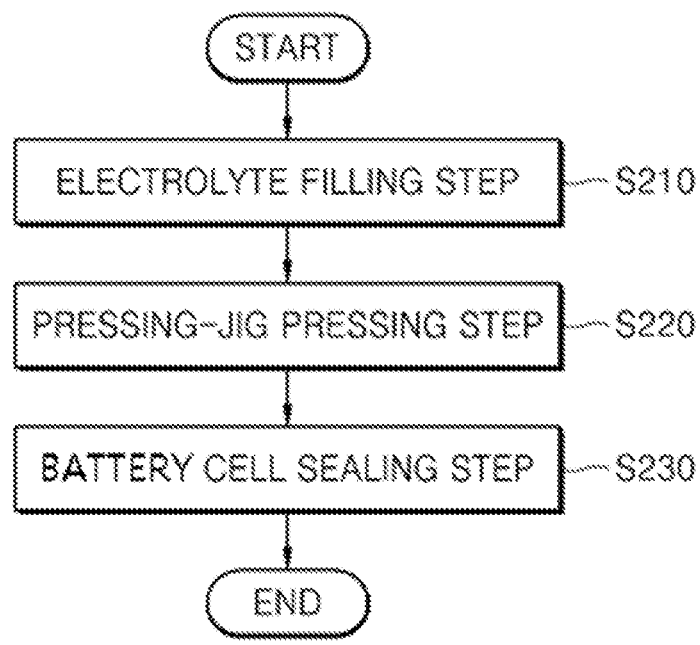
FIG. 2 is a flowchart of a method for manufacturing a battery cell in accordance with a first exemplary embodiment.

FIG. 2 is a flowchart of a method for manufacturing a battery cell in accordance with a first exemplary embodiment.

Referring to FIG. 2, in a method for manufacturing a battery cell in accordance with a first exemplary embodiment, an electrolyte is firstly filled into a battery cell having an electrolyte filling path formed on one side or both sides thereof (an electrolyte filling step: S210), and when the electrolyte is completely filled, a pressing jig squeezes the battery cell (a pressing-jig pressing step: S220) so that air bubbles formed in the battery cell when the electrolyte is filled is discharged.

In addition, after pressing with the pressing jig, the electrolyte filling path is removed, and the battery cell is sealed (a battery cell sealing step: S230).

In general, the manufacturing processes of the battery cell are roughly divided into three processes, such as an electrode process, an assembly process, and a formation process, and air bubbles are usually formed in the assembly process and the formation process.

Accordingly, the first exemplary embodiment will discuss a method with which a battery cell is manufactured by removing air bubbles formed in an electrolyte filling step during the above-mentioned assembly process.

Each of the steps of the method for manufacturing the battery cell will be described below in more detail.

The electrolyte filling step S210 is a step in which an electrolyte is filled into the battery cell by using the electrolyte filling path formed on one side or both sides of the battery cell.

During the assembly process, this step is performed after a notching step in which unnecessary portions are removed from the electrodes, a stack and folding step in which positive electrode materials, separators, and negative electrode materials are alternately laminated and then folded multiple times based on the battery capacity, or a winding step in which electrodes and the separators are overlapped and rolled, and a packaging step in which the assembly is enclosed with an aluminum film packaging material.

Accordingly, the structure of one battery cell is completed when the electrolyte is filled and then sealed.

In addition, a lithium salt-based material is generally used as the electrolyte, and hexafluoride lithium phosphate ($LiPF_6$) is mainly used.

In addition, the electrolyte filling path may be formed on only one side for easy sealing or also be formed on both sides facing each other for quick filling of the electrolyte.

When the electrolyte filling path is formed on both sides, the electrolyte filling path is configured such that air may be discharged from the inside but liquid may be prevented from being discharged so that the electrolyte already filled may not be discharged through the electrolyte filling path.

In addition, the pressing-jig pressing step S220 is a step in which after the electrolyte filling step S210 is performed, a pair of pressing jigs 120 are pressed so that air bubbles formed in the battery cell 110 are discharged to the outside.

This pressing-jig pressing step S220 will be described below in more detail with reference to FIG. 3.

Figure 3:
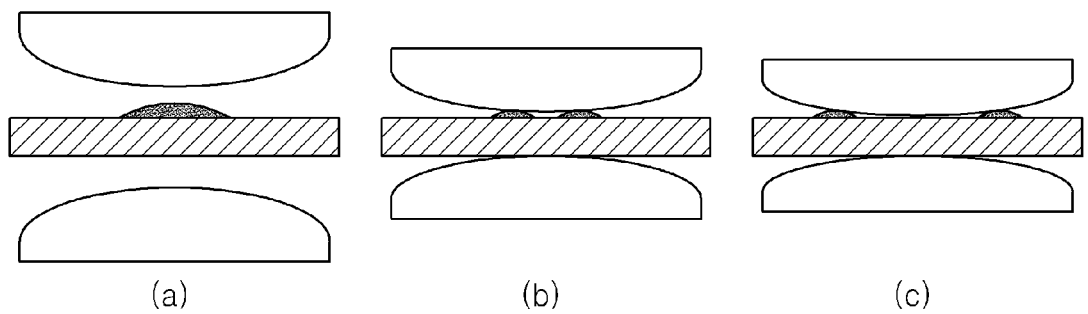
FIG. 3 is a schematic view of a pressing-jig pressing step in a method for manufacturing a battery cell in accordance with a first exemplary embodiment.

FIG. 3 is a schematic view of a pressing-jig pressing step in a method for manufacturing a battery cell in accordance with an exemplary embodiment.

Referring to FIG. 3, firstly, at the moment when the pair of pressing jigs 120 initially contact the battery cell, air bubbles formed on a central portion are displaced to peripheral portions as the pressing parts formed on a lower portion of the pressing jigs press the central portion of the battery cell (a central portion pressing step: (a) of FIG. 3).

Then, since the pair of pressing jigs 120 are made of a flexible, elastic material, the pressure of the pressing parts is sequentially applied from the central portion of the battery cell to peripheral portions, and the air bubbles displaced to the peripheral portions in the central portion pressing step (a) of FIG. 3 are gradually displaced to edges of the battery cell and discharged to the outside (a peripheral portion pressing step (b) of FIG. 3).

As such, the contact surfaces of the pressing parts are expanded from the central portion of the battery cell to the peripheral portions and allow the air bubbles to be discharged to the outside.

In addition, the pressing parts of the pair of pressing jigs 120 may be formed in semi-elliptical shapes, and thus, the air bubbles may effectively be removed even when a smaller pressure is applied than a typical pressing jig.

Thus, in the pressing-jig pressing step S220, the pair of pressing jigs 120 are pressed for a predetermined time, and the time may be set inversely proportional to the applied pressure.

In addition, the number of times repeating the pressing-jig pressing step S220 is set to two times or more in the first exemplary embodiment to effectively remove the air bubbles, and to less than 7 times to reduce a lead time. The value is not limited thereto, but may be changed according to a user.

Also, the pair of pressing jigs 120 in the pressing-jig pressing step S220 may allow the air bubbles to be effectively removed by applying not only pressure but also a predetermined amount of heat.

In addition, the air bubbles discharged to the outside by being pressed in the pressing-jig pressing step S220 are discharged to the outside through the electrolyte filling path.

Also, in the pressing-jig pressing step S220, the pair of pressing jigs 120 may apply a pressure by the operations of upper and lower hydraulic cylinders, but exemplary embodiments are not limited thereto.

In addition, the battery cell sealing step S230 is a step in which the electrolyte filling path is removed and the battery cell is sealed after the pressing-jig pressing step S220 is performed.

In a general method of sealing the battery cell, the battery cell is sealed by thermally fusing an aluminum film packaging material constituting the outer portion of the battery cell.

Embodiment 3

Next, a method for manufacturing a battery cell in accordance with a second exemplary embodiment will be described.

A method for manufacturing a battery cell in accordance with the exemplary embodiment is a method in which the battery cell is manufactured such that air bubbles formed in the battery cell during a formation process are removed.

Figure 4:
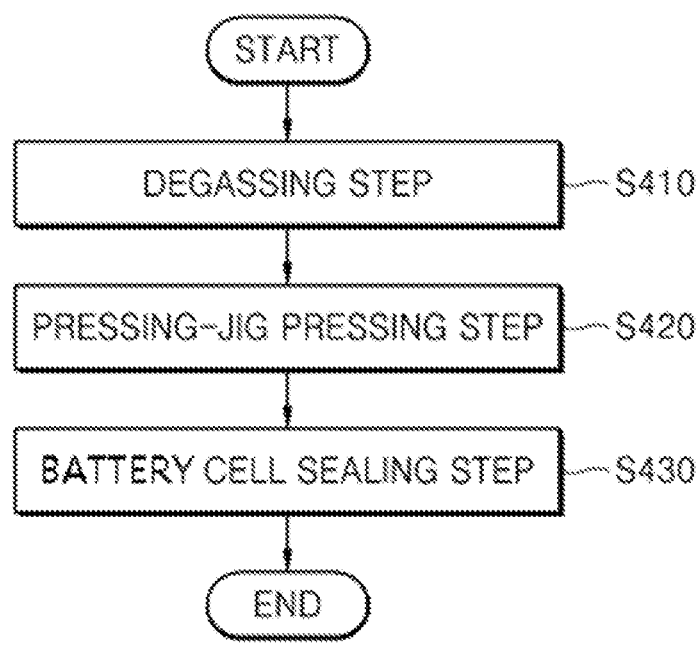
FIG. 4 is a flowchart of a method for manufacturing a battery cell in accordance with a second exemplary embodiment.

FIG. 4 is a flowchart of a method for manufacturing a battery cell in accordance with the second exemplary embodiment.

Referring to FIG. 4, the method for manufacturing a battery cell in accordance with the exemplary embodiment firstly discharges the gas generated during a formation process from the inside of the battery cell 110 having a gas discharge path on one side or both sides thereof (a gas discharge step: S410), and squeezes the cavities remaining after discharging the gas to be discharged to the outside of the battery cell 110 by a pressing jig (a pressing-jig pressing step: S420).

After performing the pressing-jig pressing step S420, the gas discharging path is removed and the battery cell is sealed (a battery cell sealing step: S430).

Each of the steps of the method for manufacturing the battery cell will be described below in more detail.

The gas discharging step S410 is a step in which the gas generated through the formation process is discharged from the inside of the battery cell 110 having the gas discharge path on one side or both sides thereof.

This is a degassing step in which the battery cell is subjected to formation while the charge/discharge of the assembled battery cell is repeated during the formation step, and the gas generated in the battery cell during the formation is discharged.

In addition, the gas discharge path may be formed on only one side for easy sealing or also be formed on both sides facing each other for prompt discharge of the gas.

In addition, the gas discharge path is configured such that liquid is prevented from being discharged from the inside so that the already filled electrolyte may not be discharged.

The gas which was not discharged in the gas discharge step S410 remains on the inner surface of the battery cell and forms air bubbles, and the air bubbles degrade the battery cell performance and reduce the service life of the battery cell.

Thus, the pressing-jig pressing step S420 in which the battery cell 110 is pressed by a pair of pressing jigs 120 is performed, and this will be described in more detail below.

The pressing-jig pressing step S420 is a step, in which the pressing jigs are pressed so that the air bubbles remaining after the gas discharge step S410 is discharged to the outside of the battery cell 110.

This pressing-jig pressing step S420 will be described below in more detail with reference to FIG. 3.

Referring to FIG. 3, firstly, at the moment when the pair of pressing jigs 120 initially contact the battery cell, air bubbles formed on a central portion are displaced to peripheral portions as the pressing parts formed on lower portions of the pressing jigs press the central portion of the battery cell (a central portion pressing step: (a) of FIG. 3).

Then, since the pair of pressing jigs 120 are made of a flexible, elastic material, the pressure of the pressing parts is sequentially applied from the central portion of the battery cell to peripheral portions, and the air bubbles displaced to the peripheral portions in the central portion pressing step (a) of FIG. 3 are gradually displaced to peripheral portions of the battery cell and discharged to the outside (a peripheral portion pressing step (b) of FIG. 3).

As such, the contact surfaces of the pressing parts are expanded from the central portion of the battery cell to the peripheral portions and allow the cavities to be discharged to the outside.

In addition, the pressing parts of the pair of pressing jigs 120 may be formed in semi-elliptical shapes, and thus, the air bubbles may effectively be removed even when a smaller pressure is applied than what is applied to a typical pressing jig.

Thus, in the pressing-jig pressing step S420, the pair of pressing jigs 120 are pressed for a predetermined time, and the time may be set inversely proportional to the applied pressure.

In addition, the number of times performing the pressing-jig pressing step S420 is set to two times or more in the second exemplary embodiment to effectively remove the air bubbles, and to less than 5 times to reduce the lead time. The value is not limited thereto, but may be changed according to a user.

Also, the pressing jigs 120 in the pressing-jig pressing step S420 may allow the air bubbles to be effectively removed by applying not only pressure but also a predetermined amount of heat.

In addition, the air bubbles discharged to the outside by being pressed in the pressing-jig pressing step S420 are discharged to the outside through the gas discharge path.

Also, in the pressing-jig pressing step S420, the pair of pressing jigs 120 may apply a pressure by the operations of upper and lower hydraulic cylinders, but exemplary embodiments are not limited thereto.

In addition, the battery cell sealing step S430 is a step in which the gas discharge path is removed and the battery cell is sealed after the pressing-jig pressing step S420 is performed.

In a general method of sealing the battery cell, the battery cell is sealed by thermally fusing an aluminum film packaging material constituting the outer portion of the battery cell.

In general, air bubbles are mainly formed in the assembly process and the formation process, and the first and second exemplary embodiments are performed, but even when air bubbles are formed in other processes, the air bubbles may be removed by pressing with the pair of pressing jigs 120.

In an apparatus and a method for manufacturing a battery cell in accordance with exemplary embodiments, a pressing jig provided with a semi-elliptical pressing part may squeeze the battery cell to remove air bubbles formed on the inner surface of a battery cell, and thus, a stable battery cell can be manufactured.

The technical idea of the present disclosure has been specifically described with respect to the above embodiments, but it should be noted that the foregoing embodiments are provided only for illustration purposes and not for limiting the present disclosure. In addition, a person with an ordinary skill in the technical field that the present disclosure belongs to may carry out various embodiments within the scope of claims set forth herein.

What is claimed is:

1. An apparatus for manufacturing a battery cell to remove air bubbles from the battery cell, the apparatus comprising:
   a pair of pressing jigs each having a semi-elliptical pressing part made of a flexible, elastic material formed on a contact surface contacting the battery cell and configured to apply a pressure to upper and lower portions of the battery cell, the pressure being applied sequentially from a central portion of the battery cell to first and second peripheral portions so as to displace the air bubbles to the first and second peripheral portions, wherein the first and second peripheral portions are located on opposite sides of the battery cell; and
   a support part configured to fix the battery cell between the pair of pressing jigs,
   wherein the pressure is applied to the pair of pressing jigs to discharge the air bubbles from the first and second peripheral portions to outside of the battery cell.

2. The apparatus of claim 1, wherein each of the pair of pressing jigs is larger than the battery cell.

3. The apparatus of claim 1, wherein the pair of pressing jigs discharge the air bubbles by further applying a predetermined amount of heat when pressing the battery cell.

* * * * *